United States Patent

[11] 3,599,654

[72] Inventor Curtis C. Beusman
         Mount Kisco, N.Y.
[21] Appl. No. 6,401
[22] Filed Jan. 28, 1970
[45] Patented Aug. 17, 1971
[73] Assignee Curtis Instruments, Inc.
         Mount Kisco, N.Y.

[54] ELECTROLYTIC FLUID RELEASE TIMER
     5 Claims, 1 Drawing Fig.
[52] U.S. Cl. .................................................. 137/67,
                                                          137/614.11
[51] Int. Cl. .......................................... F16k 31/00
[50] Field of Search ........................................ 137/67-
                                                    —71, 614.11; 251/68

[56] References Cited
     UNITED STATES PATENTS
3,078,862  2/1963  Maly .......................... 137/67
3,308,046  3/1967  Suleski ....................... 137/67 X
     FOREIGN PATENTS
774,538  9/1934  France ........................ 137/68

Primary Examiner—M. Cary Nelson
Assistant Examiner—Richard Gerard
Attorney—Pennie, Edmonds, Morton, Taylor and Adams ABSTRACT: A fluid release timer is disclosed which comprises a hollow housing, including a fluid passage therethrough, and a pair of plug members, sealing the fluid passage, which are held together against expansive forces by an electrolytically erodable wire. An electrolyte is disposed within the housing in contact with the wire, and an electrode is placed in contact with the electrolyte for permitting control over the rate of erosion. In operation, the application of a negative voltage between the wire and the housing electrode gradually and controllably erodes the wire—eventually resulting in the ejection of the plugs from the fluid passage. A preferred embodiment is described which utilizes polyethylene for the housing and plugs, silver for the electrode and wire, and silver fluoroborate for the electrolyte. In order to increase reliability, the longitudinal thickness of the housing electrode is made small compared to the length of the wire.

PATENTED AUG 17 1971
3,599,654
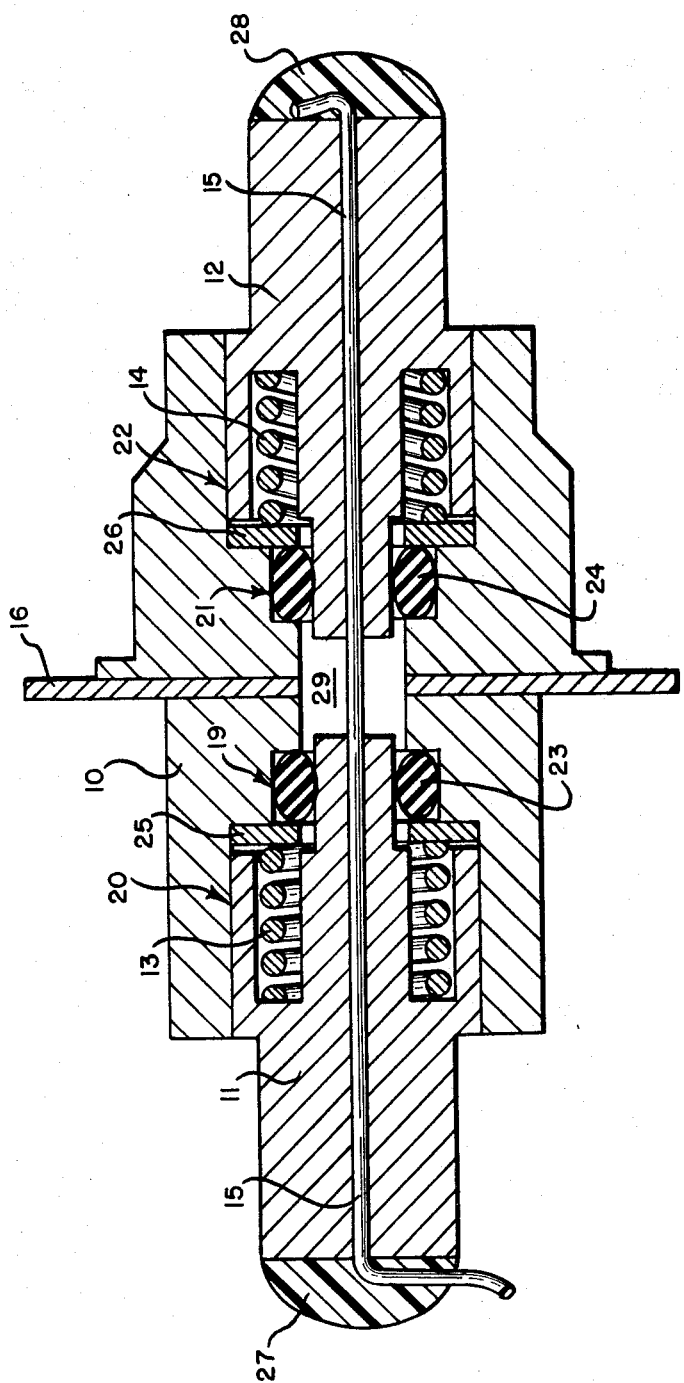
INVENTOR
Curtis C. Beusman
BY
Pennie, Edmonds, Morton,
Taylor & Adams ATTORNEYS

ELECTROLYTIC FLUID RELEASE TIMER

Background of the Invention

This invention relates to an electrolytic timing device for opening a passage through which fluid can flow.

Devices for producing a fluid flow passage after the elapse of a predetermined length of time (henceforth referred to as fluid release timers) are useful in a wide variety of applications. For example, such devices are used as flotation collar blow off timers and balloon rupturing timers in a number of military and industrial systems.

SUMMARY OF THE INVENTION

In accordance with the present invention, a fluid release timer comprises a hollow housing, including a fluid passage therethrough and at least one plug member for sealing the fluid passage. Means, such as compressed springs, are provided for applying to each plug member a force tending to eject it from the passage. An electrolytically erodable member is constructed and arranged to restrain each plug member against the ejecting force. An electrolyte is disposed in contact with both the erodable member and an additional electrode so that the application of a negative voltage between the wire and the additional electrode gradually and controllably erodes the wire, resulting in the ejection of each plug member from the fluid passage.

BRIEF DESCRIPTION OF THE DRAWINGS

The objects, features and advantages of the invention will be more clearly understood from the following detailed description taken in conjunction with the drawings which shows a schematic cross section of an illustrative embodiment of the invention.

DETAILED DESCRIPTION

In the drawings there is shown a fluid release timer comprising a hollow housing 10, the ends of which are sealed by a pair of plug member 11 and 12. Both the housing and the plugs are preferably relatively inert insulating materials such as high density polethylene. The plug members are held together in the housing against the expansive forces exerted by compressed springs 13 and 14 by a metal wire 15 attached to each of the plug members.

The housing includes a ringlike metal housing electrode 16, preferably silver, exposed in the interior portion of the housing and having portions extending transversely through the housing to facilitate electrical contact. The longitudinal thickness of the electrode is small compared to the distance between the two plug members.

The ends of the housing are advantageously provided with counterbores 19, 20, 21 and 22 which serve to support various elements. In particular, counterbores 19 and 21 contain O-rings 23 and 24, respectively, in order to help maintain a fluid seal between the plugs and the housing, and retainer discs 25 and 26 rest against the steps between counterbores 19, 20, and 21, 22, respectively, in order to hold the O-rings in place and, in addition, to provide supports for springs 13 and 14.

Wire, 15, which is preferably silver, is attached to each of the plug members. The attachment may be conveniently secured by running the wire through the plugs and bonding it at the ends with epoxy resin, forming supports 27 and 28 at opposite ends of the structure.

The space 29 within the housing between the housing electrode and the wire is filled with an elecrolyte 27. One example of a suitable electrolyte for use with silver electrodes is a solution of silver fluoroborate.

In operation, a voltage, typically DC, is applied between the housing electrode and the wire so that the housing electrode is negative with respect to the wire. The voltage induces migration of metal ions from the wire to the anode; and, after the passage of a predetermined length of time the wire erodes to a sufficient extent that it parts due to the expansive forces exerted by the springs on the plug members. The plugs are consequently ejected, and a fluid passage is opened through the housing. The relationships between the voltage, spring compression and wire thickness are sufficiently well known that the approximate time of ejection can be easily calculated. Empirical methods can be used to establish more accurate predictions.

The advantage of using a housing electrode having a longitudinal thickness which is small compared to the distance between the plugs (and hence is also small compared to the length of wire exposed to the electrolyte) is an increase in the reliability of the timer due to the prevention of dendritic growth. Dendritic or treelike growth of metal from the anode to the cathode is a significant source of failure in electrolytic timers. It has been found, however, that the use of this electrode configuration produces an adherent deposit of metal on the anode and substantially eliminates dendritic growth.

While the invention is described in connection with only a single embodiment, it is understood that this example is merely illustrative of the many possible specific embodiments which can represent applications of the principles of the invention. Numerous and varied other arrangements can be readily devised in accordance with these principles by those skilled in the art without departing from the spirit and scope of the invention.

I claim:

1. A fluid release timer comprising:
   a hollow housing member including a fluid passage therethrough;
   at least one plug member for sealing said fluid passage;
   means for applying against each said plug member a force tending to eject it from said passage;
   an electrolytically erodable member constructed and arranged to restrain each said plug member against the ejecting force;
   an electrolyte disposed in contact with said erodable member;
   an electrode in contact with said electrolyte; and
   means for making electrical contact with said erodable member and said electrode.

2. A fluid release timer comprising:
   a hollow housing member including fluid passage therethrough;
   a pair of plug members for sealing said fluid passage;
   means for applying to each of said plug members a force tending to eject them from said fluid passage;
   a metal wire for connecting said pair of plug members for restraining them against said expansive forces;
   an electrolyte disposed within said hollow housing in contact with said wire;
   an electrode disposed within said hollow housing in contact with said electrolyte; and
   means for making electrical contact with said metal wire and said electrode.

3. A timer according to claim 2 where the means for applying ejecting force to each plug member is a compressed spring disposed between said member and said hollow housing.

4. A timer according to claim 3 wherein the electrode within said housing is a ringlike metal electrode having a thickness in the longitudinal direction which is small compared to the length of the wire exposed to the electrolyte.

5. A timer according to claim 4 wherein said housing member and said plugs are polyethylene, said electrode and said wire are silver and said electrolyte is a solution of silver fluoroborate.